2,711,963

MALT BEVERAGES

Philip P. Gray, Forest Hills, N. Y., assignor to Wallerstein Company, Inc., New York, N. Y., a corporation of New York No Drawing. Application July 13, 1949,
Serial No. 104,599

7 Claims. (Cl. 99—48)

This invention relates to the treatment of malt beverages to prevent the development of the condition known as wildness or gushing and comprises both a method of treatment and the new beverage compositions thereby produced.

In the production of beers and ales, these beverages are normally carbonated to the extent of about 0.35 to 0.55 by weight of $CO_2$. When a container of these beverages is opened, the gas dissolved in the liquid is in a state of supersaturation. In most instances, after removal of the sealing means thus reducing the pressure over the beverage to that of the surrounding atmosphere, the beverage will be found to remain fairly quiet with very little evolution of the dissolved gas. However, in some cases, when the cap is removed, the gas evolution will be rapid and violent causing the beer to shoot out of the container and producing considerable loss of liquid. This condition is known as "wildness" or "gushing beer." The condition is not caused by over-carbonation but appears to be due to the formation of certain specific types of colloidal nuclei which have the property of causing the evolution of the dissolved gas from the beverage. The factors leading to the production of these nuclei appear to be latent in all malt beverages.

It has been found that among the factors tending to produce these nuclei are prolonged storage of the container at low temperatures, vibration, oxidation and the presence of certain metals in trace quantities, especially when such factors act in combination with one another. Among the metals found to produce the greatest effect are iron, nickel and cobalt. Other metals producing this undesirable gushing to a lesser extent are copper, tin, and others.

These trace metals may find their way into the beverage in various ways. They may be picked up from exposed metal surfaces in the brewery during the processing of the beer. They may exist in the raw materials, possibly being picked up by the cereal grains from the soil upon which they are grown. In any event, it has been found that the presence of one part per million of iron, cobalt or nickel, for instance, can convert a normal quiet beer into a gushing beer.

We have now found that the addition of agents that tend to bind these trace metals in fairly stable complexes prevent the later development of wildness. The action of these binding or chelating agents is probably due to the fact that the stable complexes formed with the metals are such that no free metallic ions are available for the production of gas evolving nuclei.

There are many available compounds which form stable complexes with metals. The particular ones used for the purpose of preventing gushing in fermented malt beverages will depend in part on the contaminating metal responsible for the condition. Since the final product is a beverage for human consumption, it is necessary that the additional factors of non-toxicity and taste be considered in the selection of the complex-forming material in addition to its other needed properties. We have found that the sodium salt of ethylenediamine tetra-acetic acid is suitable for this purpose. In amounts of about one pound to fifty barrels, this material protects the beverage from the deleterious effects of heavy metals such as nickel, cobalt, iron and copper.

The complex-forming materials can be added to the beverage at any stage of its processing from the initial mashing stage all the way to immediately before closure of the packaged beverage. However, we have found that the most convenient place to add the materials is when the beer is in storage after completion of fermentation. The amount added will, of course, depend on the nature of the material and the amount of contaminating trace elements present but, in general, we have found that when using the sodium salts of ethylenediamine tetra-acetic acid, a quantity of approximately one pound in fifty barrels is usually sufficient.

I claim:

1. A method of treating fermented malt beverages to prevent "gushing" which comprises adding to the beverage a sodium salt of ethylenediamine tetra-acetic acid in an amount sufficient to bind substantially all the heavy-metal ions present in the beverage in non-ionized form.

2. A method of treating fermented malt beverages to prevent "gushing" which comprises adding to the beverage a sodium salt of ethylenediamine tetra-acetic acid in the proportion of about one pound to fifty barrels of the beverage.

3. A fermented malt beverage containing a sodium salt of ethylenediamine tetra-acetic acid in an amount sufficient to bind substantially all of the heavy metal ions in the beverage in non-ionized form.

4. A fermented malt beverage containing a sodium salt of ethylenediamine tetra-acetic acid in the proportion of about one pound to fifty barrels of the beverage.

5. A method of treating fermented malt beverages to prevent "gushing" which comprises adding to the beverage a water-soluble salt of ethylenediamine tetra-acetic acid in an amount sufficient to bind substantially all the heavy-metal ions present in the beverage in non-ionized form.

6. A fermented malt beverage containing a water-soluble salt of ethylenediamine tetra-acetic acid in an amount sufficient to bind substantially all of the heavy-metal ions in the beverage in non-ionized form.

7. A fermented malt beverage containing an amount of a water soluble salt of ethylene diamine tetra-acetic acid sufficient to stabilize the beverage.

References Cited in the file of this patent

UNITED STATES PATENTS

| Number | Name | Date |
|---|---|---|
| 1,006,154 | Wahl | Oct. 17, 1911 |
| 1,081,723 | Ornstein | Dec. 16, 1913 |
| 1,162,212 | Bloom | Nov. 30, 1915 |
| 1,401,700 | Heuser | Dec. 27, 1921 |
| 2,086,891 | Bachmann et al. | July 13, 1937 |
| 2,088,712 | Melton | Aug. 3, 1937 |
| 2,105,701 | Ramage | Jan. 18, 1938 |
| 2,223,244 | Bohm et al. | Nov. 26, 1940 |
| 2,371,623 | Henderson | Mar. 20, 1945 |
| 2,384,818 | Curme | Sept. 18, 1945 |
| 2,428,353 | Bersworth | Oct. 7, 1947 |
| 2,461,519 | Bersworth | Feb. 15, 1949 |
| 2,474,229 | Coleman et al. | June 28, 1949 |
| 2,500,019 | Bersworth | Mar. 7, 1950 |

OTHER REFERENCES

Technical Bulletin No. 1 of the Bersworth Chemical Co., Framington, Mass. Copyright 1949, pages 1 to 5, 7 and 22.